United States Patent [19]
Röhm

[11] Patent Number: 4,664,568
[45] Date of Patent: May 12, 1987

[54] DRILL CHUCK FOR GROOVED AND UNGROOVED DRILL-BIT SHANKS

[76] Inventor: Günter H. Röhm, Heinrich-Röhm Str. 50, 7927 Sontheim, Fed. Rep. of Germany

[21] Appl. No.: 788,775

[22] Filed: Oct. 18, 1985

[30] Foreign Application Priority Data

Oct. 20, 1984 [DE] Fed. Rep. of Germany ....... 3438595

[51] Int. Cl.$^4$ .............................................. B23B 31/04
[52] U.S. Cl. ..................................... 408/226; 279/191; 279/123; 408/240
[58] Field of Search .................... 408/238, 239 R, 226, 408/240; 279/19, 19.3, 19.5, 66, 67, 110, 111, 114, 123, 19.1, 19.2, 19.4, 19.6, 19.7

[56] References Cited

U.S. PATENT DOCUMENTS 1,977,363 10/1934 Williams ............................. 279/114
3,637,225 1/1972 Schmuck .............................. 279/81

FOREIGN PATENT DOCUMENTS 492665 8/1950 Canada ................................ 279/114
2030485 4/1980 United Kingdom ................... 279/19
2103988 3/1983 United Kingdom .............. 279/19.5

Primary Examiner—Z. R. Bilinsky
Assistant Examiner—A. Dougas
Attorney, Agent, or Firm—Karl F. Ross; Herbert Dubno

[57] ABSTRACT

A chuck centered on an axis and having a plurality of jaws each displaceable radially of the chuck axis is usable in combination with a drill bit having a shank formed with respective grooves each having axially extending and angularly directed flank surfaces engageable with the jaws to rotationally link the bit to the chuck. Each jaw is substantially symmetrical to a respective jaw plane extending substantially radially of the chuck axis. In addition each jaw is formed with a pair of angularly spaced teeth substantially symmetrically flanking the respective jaw plane and each having a respective inwardly directed edge and an outer tooth surface extending radially back therefrom and angularly away from the respective jaw plane. Each jaw also has pair of angularly spaced shoulder surfaces substantially symmetrically flanking the respective outer teeth surfaces and each having an inner end generally tangent to an inner plane substantially perpendicular to the respective jaw plane and parallel to the chuck axis and an outer end generally tangent to an abutment plane extending substantially parallel to the chuck axis and at an angle to the respective jaw plane corresponding to the angle formed by the respective bit-shank flank surface at the point of contact with the respective shoulder surface, the inner plane lying radially outward of the respective teeth edges.

10 Claims, 4 Drawing Figures

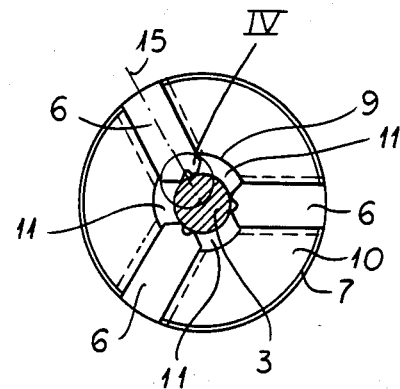
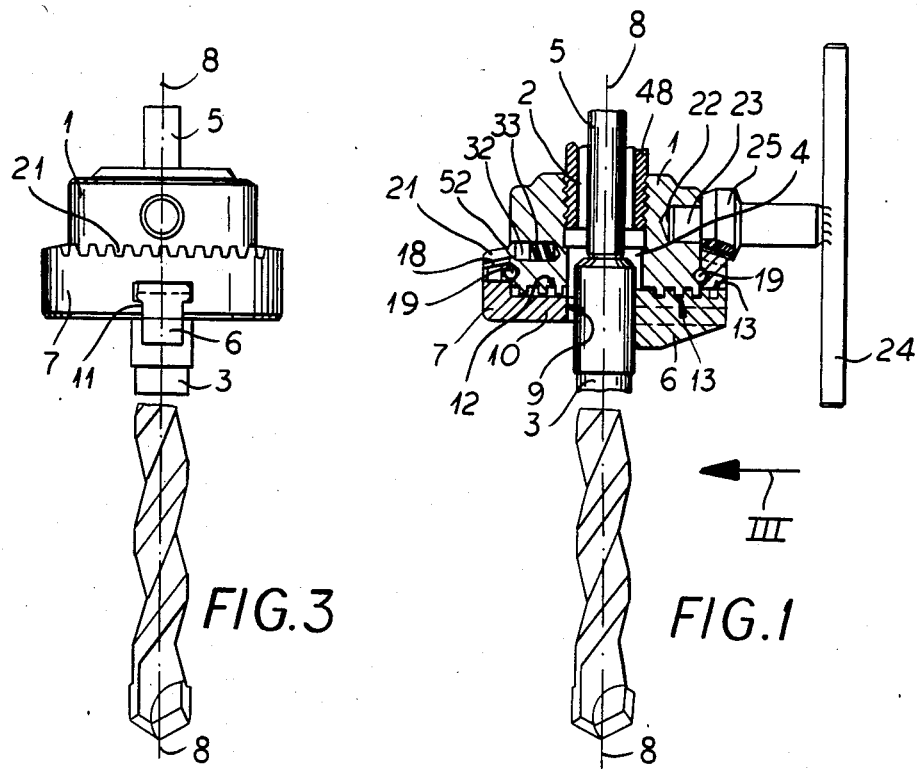

DRILL CHUCK FOR GROOVED AND UNGROOVED DRILL-BIT SHANKS

FIELD OF THE INVENTION

The present invention relates to a drill chuck. More particularly this invention concerns a chuck of the type normally used in a hammer drill.

BACKGROUND OF THE INVENTION

A standard hammer drill has a drive spindle that is rotated about a spindle axis and a hammer displaceable axially in the drive spindle. A chuck is carried on the spindle so as to rotate therewith, and holds a drill bit having a shaft or shank that may be cylindrical, of hexagonal section, or formed with a radially outwardly open and at least generally axially extending groove. The chuck holds the drill bit so it is centered on the spindle axis, and the hammer is effective on the rear end of the drill bit. The bit is rotationally coupled to the chuck body, which as mentioned above is rotated, and is at least limitedly axially reciprocated by the hammer so that it can drill through masonry or the like. The jaws of the chuck are normally urged radially outward by springs and are displaced radially inward by an adjustment ring which has threads that mate with teeth on the jaws.

When such an arrangement is used with an ungrooved hexagonal-section drill bit there are as described in German utility model No. 7,227,714 three angularly equispaced jaws and each jaw has an inner end formed with a pair of radially inwardly pointing teeth. Both teeth of each tooth engage a respective one of the facets of the drill-bit shank to hold it on center and in place in the chuck against rotation relative thereto. When tightened on the shank of the bit, these jaws rotationally solidly couple the bit to the chuck body, with relatively solid six-point contact and with some axial sliding relative to the jaws still being possible.

Such an arrangement wears rapidly, the effective edges of the teeth quickly dulling and becoming no longer able to hold solidly on the drill-bit shank. In addition such a bit can normally only be used with ungrooved cylindrical-shape bit shanks that are fairly small, and this is done by providing between the two teeth forming the engagement flanks a third tooth set radially somewhat outward, that is back from the two teeth flanking it. In such an arrangement the surfaces extending from each tooth edge serve no useful function.

German patent document No. 2,842,783, (British equivalent patent No. 2,030,485) and German utility model No. 8,337,365 describe an arrangement particularly useful in hammer drills. Here the drill-bit shank is axially grooved and the jaws engage in these grooves, providing excellent angular coupling while still permitting the bit to slide axially limitedly. To this end each jaw has a pointed inner end, in effect constituting a single tooth whose flanks engage the flanks of the groove. This type of arrangement does not work effectively with cylindrical- or hexagonal drill bits, as three points of purchase are not sufficient for coupling the bit to the chuck in heavy-duty use. In short order three points bite into the shank and, therefore, loosen.

OBJECTS OF THE INVENTION

It is therefore an object of the present invention to provide an improved drill chuck.

Another object is the provision of such a drill chuck which overcomes the above-given disadvantages, that is which is usable with all types of bits.

A further object is to provide a jaw and bit combination which allows long-term clamping of the bit without loosening or substantial deformation of the jaw.

SUMMARY OF THE INVENTION

A chuck centered on an axis and having a plurality of jaws each displaceable radially of the chuck axis is usable according to the invention in combination with a drill bit having a shank formed with respective grooves each having axially extending and angularly directed flank surfaces engageable with the jaws to rotationally link the bit to the chuck. Each jaw is substantially symmetrical to a respective jaw plane extending substantially radially of the chuck axis. In addition each jaw is formed with a pair of angularly spaced teeth substantially symmetrically flanking the respective jaw plane and each having a respective inwardly directed edge and an outer tooth surface extending radially back therefrom and angularly away from the respective jaw plane. Each jaw also has pair of angularly spaced shoulder surfaces substantially symmetrically flanking the respective outer teeth surfaces and each having an inner end generally tangent to an inner plane substantially perpendicular to the respective jaw plane and parallel to the chuck axis and an outer end generally tangent to an abutment plane extending substantially parallel to the chuck axis and at an angle to the respective jaw plane corresponding to the angle formed by the respective bit-shank flank surface at the point of contact with the respective shoulder surface, the inner plane lying radially outward of the respective teeth edges.

With this arrangement the device can be used with all types of bits. Grooved bits are solidly engaged by the shoulder surfaces in which case the edges of the teeth are in the groove out of contact with the bit completely. As a result these teeth will not be worn out when the drill is used with grooved bits. The time it takes the shoulder surfaces to wear down sufficiently that the teeth edges start to bite into the grooved bit is so long that by then the jaws or bit will need replacement anyhow.

Hexagonal-shank bits are solidly held in standard six-point contact, with each pair of teeth engaging a respective one of the facets of the bit, leaving three facets clear. Cylindrical-shank bits are held between the teeth, which are angularly spaced such that virtually any size bit can be accommodated. Thus the chuck according to this invention is not a special-duty item that can only work with a particular kind of bit, but can accept virtually any standard commercially available bit.

According to a feature of this invention each jaw is formed at the respective jaw plane between the respective teeth with a radially inwardly open and axially extending groove extending radially outward past the respective inner plane. Such a groove, in connection with a relatively flat angle on the outer tooth surface, effectively limits the depth to which the respective teeth can bite into a tool, thereby substantially extending the tooth life.

Furthermore according to this invention each inner plane is spaced 0.1 mm to 0.5 mm, preferably 0.2 mm to 0.3 mm, radially outward of the respective teeth edges. Once again this shallow depth substantially limits how deep the teeth can bite into the tool. The result of this depth is that the outer teeth surfaces extend at an acute angle to a plane tangent to a cylinder centered on the axis and at the respective tooth edge.

In addition according to this invention the flank surfaces of each groove are substantially planar and extend at an angle of between 45° and 60° to the jaw plane of the tooth they engage. It is also possible for the grooves to be curved, e.g. of part-cylindrical shape, and for the two flank surfaces to be generally smooth continuations of each other that extend at between 45° and 60° to the jaw plane of the tooth they engage at the point of engagement with the respective shoulder surface. Typically according to this invention each flank surface extends at generally 60° to the jaw plane of the tooth it engages at the point of engagement with the respective shoulder surface.

Furthermore in accordance with this invention the inner end of each shoulder surface meets the respective outer tooth surface at the respective inner plane, and each outer tooth surface is substantially planar and extends at an angle of between 45° and 65° to the respective jaw plane. For maximum tooth shortness while maintaining a useful edge, each tooth also has an inner surface extending at angle of between 90° and 100° to the respective outer tooth surface, the shoulder surfaces normally being smoothly outwardly convex.

DESCRIPTION OF THE DRAWING

The above and other features and advantages will become more readily apparent from the following, reference being made to the accompanying drawing in which:

FIG. 1 is an axial section through the chuck assembly according to the invention, with the chuck key in position;

FIG. 2 is a partly sectional bottom view of FIG. 1;

FIG. 3 is a side view of the assembly according to this invention, taken in the direction of arrow III of FIG. 1, but with the key removed;

SPECIFIC DESCRIPTION

Figure 4:
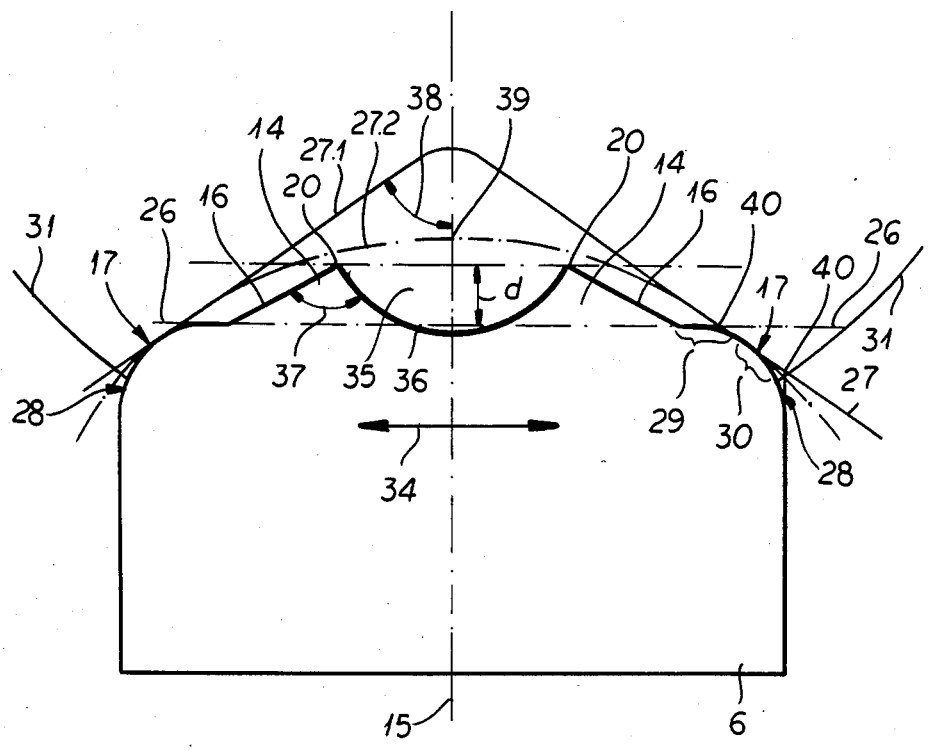
FIG. 4 is a large-scale view of the detail indicated at IV in FIG. 2.

As seen in FIGS. 1, 2, and 3, a drill chuck has a basically annular body 1 centered on an axis 8 and mounted on a tubular and externally threaded spindle 48 that rotates about this axis 8. A hammer rod 5 projects axially forward (down in the drawing) into the bore 2 from the spindle 48 and the body 1 is formed with a central hole 4 forward of the bore 2 and receiving the cylindrical shank of a masonry bit 3 also centered on the axis 8.

Three angularly equispaced T-section jaws 6 have hardened-steel tips described in greater detail below and that serve as indicated in FIG. 2 to center the shank of the bit 3 therein. These jaws 6 are slidable in respective grooves 11 in an adjustment ring 7 that is basically formed as a flat plate 10 perpendicular to the axis 8 and having a planar front face perpendicular thereto and an axially backwardly directed flange 18. The grooves 11 have side flanks formed with grooves in which the ridges or T-arms of the jaws 6 are guided, so that these jaws 6 cannot fall axially forward out of the slots 11. The ring 7 is free to rotate on the body 1 about the axis 8 and is formed with a central cylindrical hole or bore 9 of the same diameter as the bore 4 of the body 1 and coaxial therewith.

The axially forwardly directed front face of the body 1 is formed with a spiral screwthread 12 and the axially rearwardly directed edge of each T-shaped jaw 6 is formed with complementary teeth 13 in mesh therewith. Thus rotation of the ring 7 in one direction about the axis 8 will displace the jaws 6 radially synchronously inward and opposite rotation will displace them radially outward.

This rotation is effected by means of a row of teeth 21 on the axially backward edge of the rim 18 of the ring 7 and a standard chuck key 24. A radially open centering hole 22 in the body 1 receives the pilot pin 23 of the key 24, positioning its gear 25 in mesh with the teeth 21 so that rotation of this key 24 will rotate the ring 7 and thereby position the jaws 6, as is generally known per se.

The radial innermost tooth of each row of teeth 13 has a radial length that is at least equal to the radial stroke of the respective jaw 6 between its innermost and outermost positions. These teeth each serve a double function, both defining the outer position of the respective jaw 6 and blocking off the slot 11. Due to the oversizing of these innermost teeth, they are unable to fit between the turns of the spiral thread 12 and radial outward movement of all of the jaws 6 is automatically blocked when the innermost end of the spiral thread 12 engages radially against the side of one of these inner teeth. In addition even in the inner position of the respective jaw 6 the tooth still projects radially back into the slot 11, preventing any chips or the like from getting into these accurately machined guides.

Axial displacement of the ring 7 on the body 1 is inhibited by an annular row of small steel balls 19 received in confronting V-shaped circumferential grooves formed respectively on the body 1 and in the ring 7. These balls 19 are installed in the grooves, after the two parts 1 and 7 are fitted together with their grooves 49 and 50 aligned, through a radial bore that is subsequently closed with a set screw. They can be removed via this bore also.

In order to prevent the jaws 6 from working loose as the chuck is vibrated in use, a plurality of radially spaced detent pins 32 are provided which are radially displaceable in respective radially outwardly open blind bores level with the teeth 21. Springs 33 urge these pins 32 radially outward to press their rounded points 52 between the teeth 21.

The detents 32 can be angularly equispaced about the axis 8 to jointly engage fully between two teeth 21 at the same time. They can also be nonequiangularly spaced to obtain a finer ratcheting with at any one time only one detent 32 fully engaged between two teeth 21. The latter arrangement is described in more detail in my copending U.S. Pat. No. 4,568,859, to which reference should be made for further details.

According to this invention as best seen in FIG. 4 each jaw 6 is symmetrical to a respective jaw plane 15 that extends radially of the axis 8, and each jaw 6 is formed with two identical teeth 14 defining edges 20 and each having a planar outer surface 16 and an inner surface 36 forming a radially inwardly open groove 35 and lying at an angle 37 of 95° to the respective outer surface 16. These edges 20 can therefore engage a cylindrical bit shank as shown in FIG. 2 for six-point holding contact, or can similarly engage a hexagonal-section shank. Shanks of relatively small diameter and large diameter can equally be held.

It is also possible to use this arrangement with a drill bit having a shank with a cylindrical outer surface 31 formed with grooves whose inner surfaces are shown at 27.1 and 27.2 in FIG. 4. The two flanks 27.1 are inclined symmetrically and are inclined at an angle of 60° to the respective jaw plane 15. The surface shown at 27.2 is part-cylindrical and intersects the plane 15 at 39 where it forms a right angle. Both surfaces 27.1 and 27.2 engage a respective shoulder surface 17 of the respective tooth at a point of contact 40 and there defining or extending on a plane 27 forming the above-given angle of 60° to the plane 15.

The shoulder surfaces 17 are part-cylindrical and have inner portions 29 that meet the outer edge of the respective tooth surface 16 at a plane 26 which the inner portions 29 extend on or tangent to at this junction. The shoulder surfaces 17 similarly have outer portions 30 similarly having outer ends extending on and tangent to the respective contact plane 27. Outwardly of each outer portion 30 is a respective rounded portion 28 having an outer end tangent to the flat side of the tooth 6 and parallel to the plane 15 and an inner end tangent to the respective contact plane 27.

I claim:

1. In combination:
   a drill bit having a shank formed with a groove formed in turn with a plurality of axially extending and angularly directed flank surfaces;
   another different drill bit having a shank with a cylindrical and ungrooved outer surface; and
   a chuck usable with either of the bits, the chuck being centered on an axis and having a plurality of jaws each displaceable radially of the chuck axis and engageable in the grooves to rotationally link the grooved-shank bit to the chuck, each jaw being substantially symmetrical to a respective jaw plane extending substantially radially of the chuck axis, each jaw being formed with
     a pair of angularly spaced teeth substantially symmetrically flanking the respective jaw plane and each having a respective inwardly directed edge, a generally planar outer tooth surface extending generally radially back therefrom and angularly away from the respective jaw plane, and an inner tooth surface, the inner teeth surfaces of each jaw forming a radially inwardly open groove, the chuck being usable in combination with the ungrooved-shank drill bit by radially inwardly advancing the jaws to engage the tooth edges against the cylindrical outer surface; and
     a pair of angularly spaced and outwardly convexly curved shoulder surfaces substantially symmetrically flanking the respective outer teeth surfaces and each having an inner end generally tangent to an inner plane substantially perpendicular to the respective jaw plane and parallel to the chuck axis and an outer end generally tangent to an abutment plane extending substantially parallel to the chuck axis and at an angle to the respective jaw plane corresponding to the angle formed by the respective bit-shank flank surface at the point of contact with the respective shoulder surface, the inner plane lying radially outward of the respective teeth edges and the outer tooth surfaces extending to the inner plane where they meet the inner ends of the respective shoulder surfaces, the teeth and edges being spaced radially outward from and being out of contact with the bit-shank flank surfaces when the shoulder surfaces engage same.

2. The combination defined in claim 1 wherein each jaw is formed at the respective jaw plane between the respective teeth with a radially inwardly open and axially extending groove extending radially outward past the respective inner plane.

3. The combination defined in claim 1 each inner plane is spaced 0.1 mm to 0.5 mm radially outward of the respective teeth edges.

4. The combination defined in claim 1 each inner plane is spaced 0.2 mm to 0.3 mm radially outward of the respective teeth edges.

5. The combination defined in claim 1 wherein the flank surfaces of each groove are substantially planar and extend at an angle of between 45° and 60° to the jaw plane of the tooth they engage.

6. The combination defined in claim 1 wherein the grooves are curved and the two flank surfaces are generally smooth continuations of each other that extend at between 45° and 60° to the jaw plane of the tooth they engage at the point of engagement with the respective shoulder surface.

7. The combination defined in claim 1 wherein each flank surface extends at generally 60° to the jaw plane of the tooth it engages at the point of engagement with the respective shoulder surface.

8. The combination defined in claim 1 wherein the inner end of each shoulder surface meets the respective outer tooth surface at the respective inner plane.

9. The combination defined in claim 1 wherein each outer tooth surface is substantially planar and extends at an angle of between 45° and 65° to the respective jaw plane.

10. The combination defined in claim 1 wherein each tooth also has an inner surface extending at angle of between 90° and 100° to the respective outer tooth surface.

* * * * *